US008595720B2

(12) United States Patent
Kuroyanagi

(10) Patent No.: US 8,595,720 B2
(45) Date of Patent: Nov. 26, 2013

(54) PROGRAM MANAGEMENT SYSTEM, PROGRAM MANAGEMENT METHOD, CLIENT, AND COMPUTER PROGRAM PRODUCT

(75) Inventor: Tomohiro Kuroyanagi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 190 days.

(21) Appl. No.: 13/023,777

(22) Filed: Feb. 9, 2011

(65) Prior Publication Data

US 2011/0202915 A1     Aug. 18, 2011

(30) Foreign Application Priority Data

Feb. 18, 2010 (JP) .................................. 2010-034032

(51) Int. Cl.
*G06F 9/445* (2006.01)

(52) U.S. Cl.
USPC ........................................................ 717/178

(58) Field of Classification Search
None
See application file for complete search history.

(56) References Cited

U.S. PATENT DOCUMENTS

| 5,499,357 | A  | * | 3/1996  | Sonty et al. ................... 710/104 |
| 6,442,754 | B1 |   | 8/2002  | Curtis |
| 6,681,391 | B1 | * | 1/2004  | Marino et al. ................. 717/175 |
| 6,918,112 | B2 | * | 7/2005  | Bourke-Dunphy et al. .. 717/177 |
| 6,996,815 | B2 | * | 2/2006  | Bourke-Dunphy et al. .. 717/168 |
| 7,058,942 | B2 | * | 6/2006  | Bourke-Dunphy et al. .. 717/177 |
| 7,739,678 | B2 | * | 6/2010  | Damodhar ..................... 717/168 |
| 7,823,148 | B2 | * | 10/2010 | Deshpande et al. .......... 717/174 |
| 7,926,051 | B2 | * | 4/2011  | Barta et al. .................... 717/174 |
| 7,945,906 | B2 | * | 5/2011  | Bourke-Dunphy et al. .. 717/168 |
| 8,122,446 | B2 | * | 2/2012  | Moore et al. .................. 717/174 |
| 2004/0255291 | A1 |   | 12/2004 | Sierer et al. |
| 2005/0102665 | A1 | * | 5/2005  | Barta et al. .................... 717/174 |
| 2005/0188258 | A1 |   | 8/2005  | Zweifel et al. |

(Continued)

FOREIGN PATENT DOCUMENTS

| CN | 1836208 A   | 9/2006 |
| CN | 101027639 A | 8/2007 |

(Continued)

OTHER PUBLICATIONS

Extended Search Report issued Oct. 12, 2011 in European Patent Application No. 11250173.9-2211.

(Continued)

*Primary Examiner* — Don Wong
*Assistant Examiner* — Daxin Wu
(74) *Attorney, Agent, or Firm* — Oblon, Spivak, McClelland, Maier & Neustadt, L.L.P.

(57) ABSTRACT

In a client apparatus, when a request to install a program stored in a server is received, a dependence display creating unit acquires server program information including information indicating the program stored in the server and information indicating the dependence between the program and other programs, and acquires apparatus program information including information indicating a program installed in the client apparatus. The dependence display creating unit creates a display screen on the basis of the information indicating the dependence in the server program information such that the dependence between a program which is designated to be installed and other programs is clear. In addition, the dependence display creating unit displays information indicating an installed program among the programs to be installed, on the basis of the apparatus program information.

3 Claims, 13 Drawing Sheets

(56) References Cited

U.S. PATENT DOCUMENTS

| | | | |
|---|---|---|---|
| 2007/0055970 A1 | 3/2007 | Sakuda et al. | |
| 2007/0169113 A1 | 7/2007 | Moore | |
| 2008/0028395 A1* | 1/2008 | Motta et al. | 717/177 |
| 2009/0300057 A1 | 12/2009 | Friedman | |
| 2009/0300076 A1 | 12/2009 | Friedman et al. | |
| 2009/0300151 A1* | 12/2009 | Friedman et al. | 709/222 |
| 2009/0300604 A1 | 12/2009 | Barringer | |
| 2009/0300641 A1* | 12/2009 | Friedman et al. | 718/104 |
| 2010/0192147 A1* | 7/2010 | Kadota | 717/178 |
| 2011/0138374 A1* | 6/2011 | Pal | 717/169 |

FOREIGN PATENT DOCUMENTS

| | | |
|---|---|---|
| JP | 2010-11408 | 1/2010 |
| JP | 4486531 | 4/2010 |
| JP | 2010-113476 | 5/2010 |

OTHER PUBLICATIONS

Office Action mailed Jun. 19, 2013, in Chinese Patent Application No. 2011100418521 (with English-language translation).

Office Action mailed Aug. 20, 2013, in Japanese Patent Application No. 2010-034032, filed Feb. 18, 2010 (2 pages).

Kazuhiro Fukuda, /etc. directory encyclopedia, the third, Setting of YUM and APT, NIKKEI Linux, Nikkei Business Publications, Inc., Jun. 8, 2009, vol. 11, sixth number, pp. 110 to 119.

Haruhiro Yamaguchi, Easily master package administration, Software is smoothly added or deleted also in Linux, NIKKEI Linux, Nikkei Business Publications, Inc., May 8, 2006, vol. 8, fifth number, pp. 52 to 61.

Akira Yamada, First step toward administrator, Conquer Debian GNU/Linux package administration system, Part 2, Road to apt maestro, Debian GNU/Linux Expert Desktop Use Special, Gijutsu-Hyohron Co., Ltd., Sep. 25, 2004, pp. 98-106.

* cited by examiner

FIG. 2A

| ID | PROGRAM NAME |
|---|---|
| 111 | COPY PACKAGE |
| 123 | MULTI-APPLICATION PACKAGE |
| 225 | FACSIMILE PACKAGE |
| 334 | MARKING PACKAGE |
| 555 | TRANSMISSION PACKAGE |
| 678 | DOCUMENT INPUT/ OUTPUT PACKAGE |
| ⋮ | ⋮ |

FIG. 2B

| TARGET ID | DEPENDENCE DESTINATION ID |
|---|---|
| 111 | 678 |
| 123 | 225 |
| 123 | 334 |
| 123 | 555 |
| 555 | 789 |
| ⋮ | ⋮ |

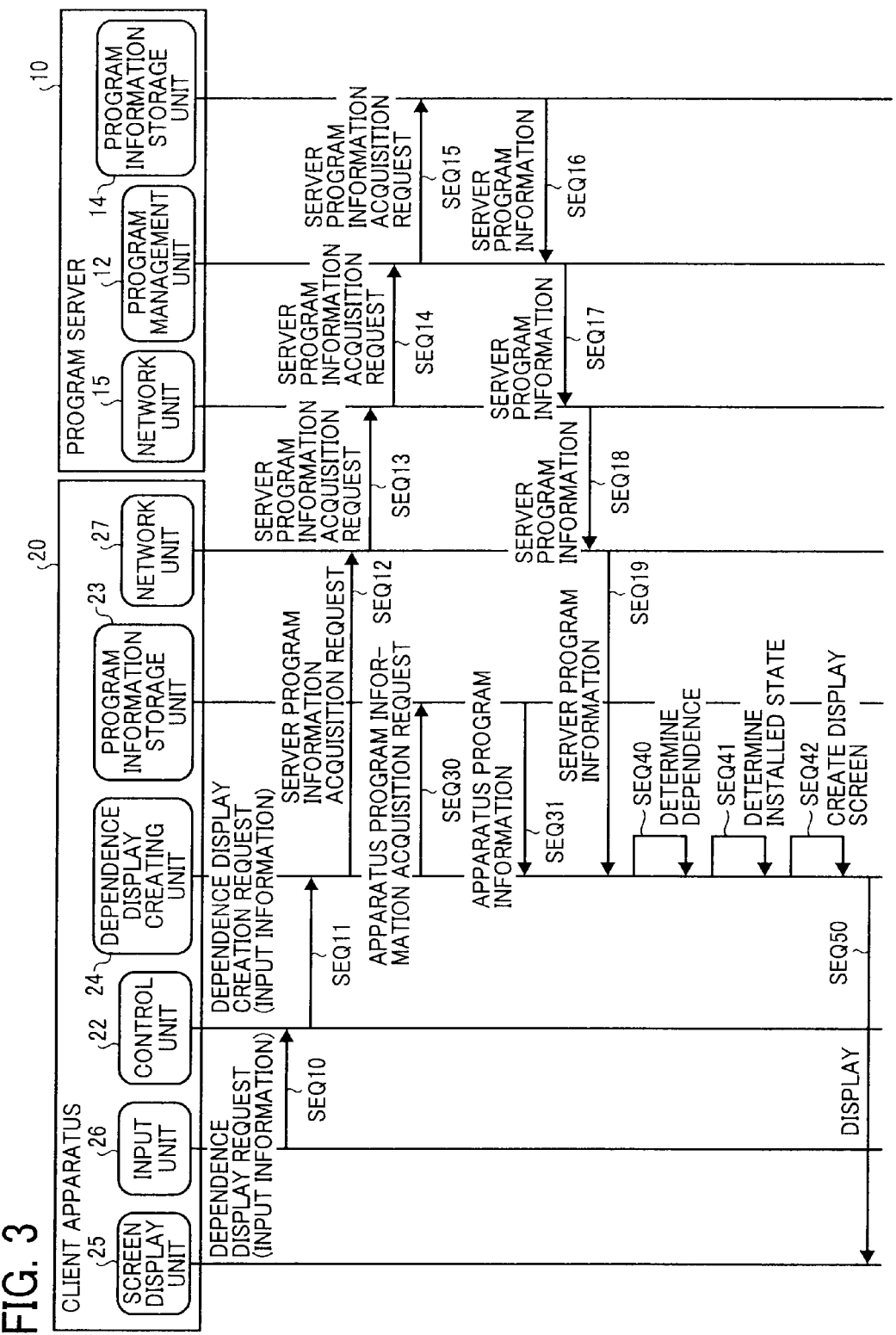

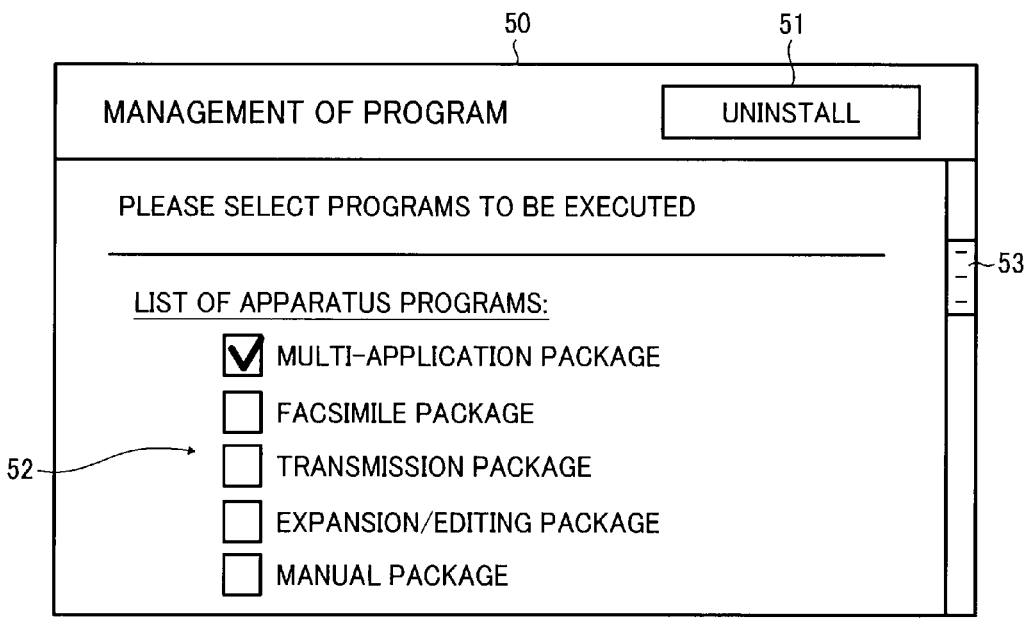

PROGRAM MANAGEMENT SYSTEM, PROGRAM MANAGEMENT METHOD, CLIENT, AND COMPUTER PROGRAM PRODUCT

CROSS-REFERENCE TO RELATED APPLICATIONS

The present application claims priority to and incorporates by reference the entire contents of Japanese Patent Application No. 2010-034032 filed in Japan on Feb. 18, 2010.

BACKGROUND OF THE INVENTION

1. Field of the Invention

The present invention relates to a program management system that manages programs, a program management method, a client, and a program.

2. Description of the Related Art

In recent years, an information processing apparatus has been proposed which has a network communication function, downloads from a program from a server through a network, and installs the program. In addition, a multi-function machine has been developed which has a printing function, a copy function, a facsimile function, and a network communication function, downloads a program from a server through a network, and installs the program. In this way, new functions can be added to the multi-function machine.

However, for example, in many cases, a plurality of programs cooperates with each other to achieve a certain function of the multi-function machine. There is dependence between the plurality of programs which cooperate with each other to achieve a certain function.

When a function is added to the multi-function machine, all of the programs which are dependent on each other need to be installed in the multi-function machine in order to achieve the function. In addition, when the function added to the multi-function machine is removed, the programs which are dependent on each other are uninstalled from the multi-function machine in order to remove the function.

Japanese Patent Application Laid-open No. 2006-261970 discloses a structure in which, when the configuration of a multi-function machine is changed, the information of the plug-in programs installed in the multi-function machine is transmitted to a server that manages the plug-in information of each multi-function machine connected to the network and the multi-function machine requests the server to determine whether to apply the plug-in program.

However, in the system according to the related art, it is difficult for the user to check the dependence between the programs, which is information required to add a function to the multi-function machine or remove the function added to the multi-function machine. This causes a problem in the management of a function adding program in the multi-function machine.

According to the structure disclosed in Japanese Patent Application Laid-open No. 2006-261970, the information of the plug-in programs is exchanged between the server and the multi-function machine through the network and the multi-function machine presents information indicating whether the plug-in programs are applicable. However, in the structure disclosed in Japanese Patent Application Laid-open No. 2006-261970, the problem that it is difficult for the user to clearly check the dependence between the programs is not solved.

SUMMARY OF THE INVENTION

It is an object of the present invention to at least partially solve the problems in the conventional technology.

According to an aspect of the present invention, there is provided a program management system including a client, and a server that is connected to the client through a network, wherein the server includes a program storage unit that stores a program to be installed in the client, and a first program information storage unit that stores first program information including information indicating the program stored in the program storage unit and information indicating dependence between the program stored in the program storage unit and other programs stored in the program storage unit, and the client includes an input unit that receives a user input, a second program information storage unit that stores second program information including information indicating an installed program and information indicating dependence between the installed program and other installed programs, and a display screen creating unit that creates a display screen for displaying the dependence between the program stored in the program storage unit or the installed program and other programs, using at least one of the first program information and the second program information, according to the user input received by the input unit.

According to another aspect of the present invention, there is provided a client including an input unit that receives a user input, a program information storage unit that stores program information including information indicating an installed program and information indicating dependence between the installed program and other installed programs; and a display screen creating unit that creates a display screen for displaying dependence between a program stored in a server or the installed program and other programs, using at least one of program information including information indicating the program which is stored in the server connected to a network and is to be installed according to the user input received by the input unit and information indicating dependence between the program stored in the server and other programs stored in the server, and the program information stored in the program information storage unit.

According to another aspect of the present invention, there is provided a computer program product comprising a computer usable medium having computer readable program codes embodied in the medium that when executed causes a computer to execute receiving a user input, acquiring at least one of first program information including information indicating a program which is stored in a server connected to a network and is to be installed according to the user input received in the receiving the user input and information indicating dependence between the program and other programs, and second program information including information indicating a program installed according to the user input received in the receiving the user input and information indicating dependence between the installed program and other installed programs, and creating a display screen for displaying dependence between the program stored in the server or the installed program and other programs using at least one of the first program information and the second program information acquired in the acquiring the at least one of the program information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2A and 2B are diagrams illustrating an example of information stored in a program information storage unit of a program server;

FIG. 3 is a sequence diagram illustrating an example of a process of creating a display screen for displaying dependence according to the first embodiment of the invention;

FIG. 10 is a diagram illustrating an example of a program management screen;

FIG. 11 is a diagram illustrating an example in which a plurality of different programs is dependent on a common program;

DETAILED DESCRIPTION OF THE PREFERRED EMBODIMENTS

First Embodiment

Figure 1:
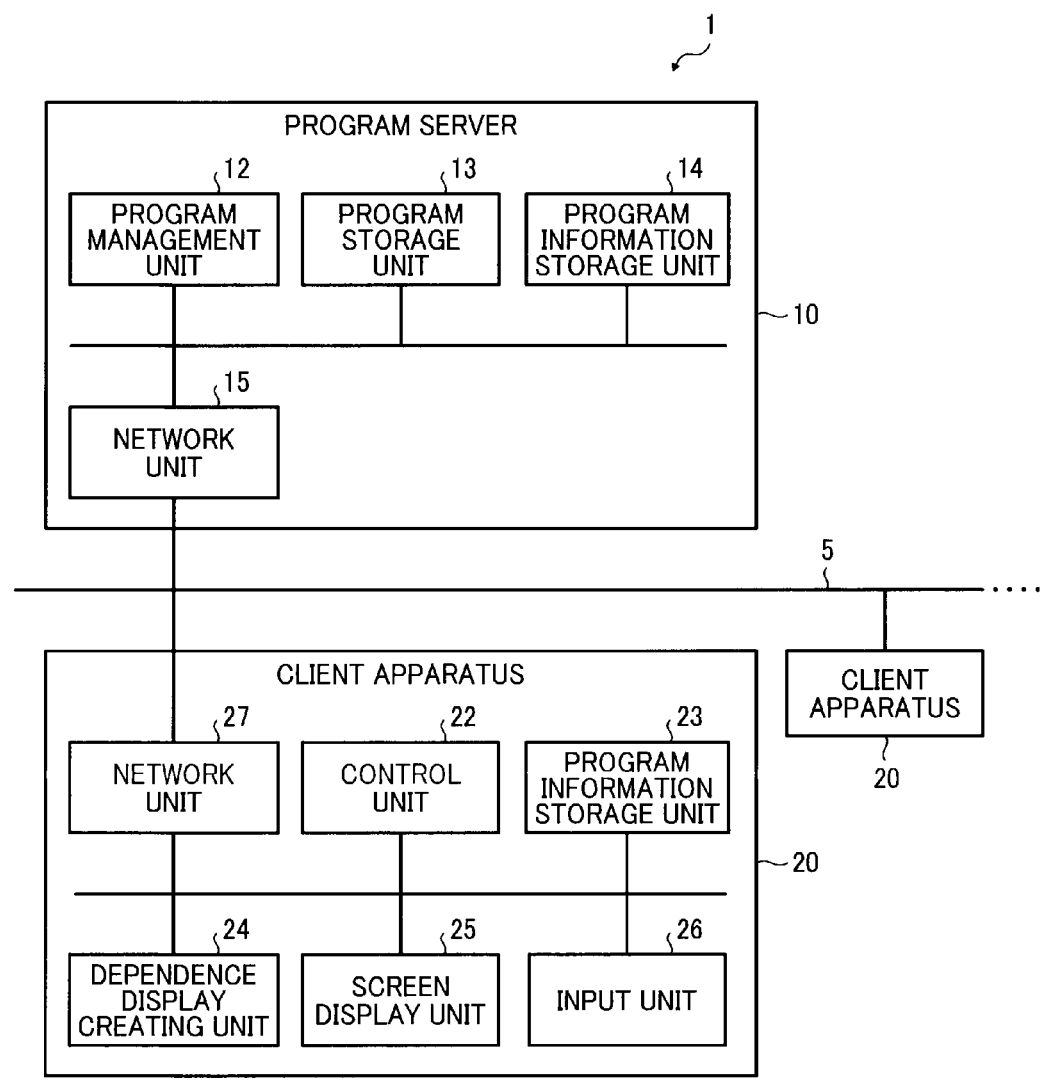
FIG. 1 is a block diagram schematically illustrating the structure of a program management system according to a first embodiment of the invention.

Hereinafter, a program management system according to a first embodiment of the invention will be described with reference to the accompanying drawings. FIG. 1 is a block diagram schematically illustrating the structure of a program management system 1 according to the first embodiment. A program server 10 and client apparatuses 20 are connected to a network 5, such as a local area network (LAN), such that the program server 10 and the client apparatuses 20 can communicate with each other.

The program server 10 is a general computer including, for example, a central processing unit (CPU), a random access memory (RAM), and a read only memory (ROM) and manages programs for adding functions to each of the client apparatuses 20 according to a control program executed on the CPU. The control program is provided to the program server 10 through, for example, a recording medium, such as a compact disk (CD) or a digital versatile disk (DVD), or a network.

Each of the client apparatuses 20 can download a program or a program group for adding functions thereto from the program server 10 through the network 5 and install the downloaded program. In the following description, as long as the program is not particularly specified, the program indicates a program for adding functions to the client apparatus 20.

The client apparatus 20 is, for example, a multi-function printer (MFP) capable of achieving a plurality of functions, such as a print function, a copy function, and a facsimile function in a housing. The client apparatus 20 includes, for example, a CPU, a RAM, and a ROM and the operation of the client apparatus 20 is controlled by a control program executed on the CPU. The control program is provided to the client apparatus 20 through, for example, a recording medium, such as a CD or a DVD, or a network.

The invention is not limited thereto, but the client apparatus 20 may be a general computer or other information processing apparatuses for performing specific functions as long as it can install the programs downloaded from the program server 10 through the network 5.

In the program management system 1, a plurality of program servers 10 may be connected to the network 5. In addition, the network 5 is not limited to the LAN, but may be a network capable of communicating with the outside, such as the Internet, or a combination of the LAN and the network capable of communicating with the outside.

The program server 10 includes a program management unit 12, a program storage unit 13, a program information storage unit 14, and a network unit 15, which are connected so as to communicate with each other. A control program for controlling the overall operation of the program server 10 is installed in a storage unit (not shown).

The program storage unit 13 stores a program for adding functions to the client apparatuses 20. The program may be an independent program or a plurality of programs that cooperates with each other. The program information storage unit 14 stores the information of the program stored in the program storage unit 13. The program information includes information indicating the dependence between programs.

The program management unit 12 manages the program stored in the program storage unit 13 by the operation of the CPU according to the control program stored in the storage unit (not shown). In addition, the network unit 15 controls communication with the network 5 according to the control program.

The client apparatus 20 includes a control unit 22, a program information storage unit 23, a dependence display creating unit 24, a screen display unit 25, an input unit 26, and a network unit 27, which are connected so as to communicate with each other.

A control program for controlling the overall operation of the client apparatus 20 or a program for achieving the functions of the client apparatus 20 is stored in a storage unit (not shown). The control program includes an installation program for installing a program for adding functions to the client apparatus 20 or uninstalling the program to remove the added functions.

The control unit 22 controls each unit of the client apparatus 20 by the operation of the CPU according to the control program. The program information storage unit 23 stores the information of the program that is installed in the client apparatus 20 and achieves the functions of the client apparatus 20. The program information includes information indicating the dependence between the programs.

The dependence display creating unit 24 creates a display screen for displaying the dependence between designated programs in response to a request from the control unit 22 by the operation of the CPU according to the control program. The screen display unit 25 displays the screen on a display device such as a liquid crystal display (LCD). The input unit 26 receives a user input. For example, the input unit 26 is a touch panel that is configured integrally with a screen display portion of the screen display unit 25 and outputs a signal corresponding to a pressed position. The network unit 27 controls communication with the network 5.

FIGS. 2A and 2B show an example of the information stored in the program information storage unit 14 of the program server 10. The program information storage unit 14 stores, for example, an ID table shown in FIG. 2A and a dependence table shown in FIG. 2B.

The ID table stores unique identification information (ID) so as to be associated with the name of the program stored in the program storage unit 13. In the example shown in FIG. 2A, unique identifiers "111," "123," "225,"... are associated with the names of the programs "copy package," "multi-application package," "facsimile package"... stored in the program storage unit 13.

The dependence table stores the dependence between the programs stored in the program storage unit 13. In FIG. 2B, for example, the identifiers of all of the programs stored in the program storage unit 13 are described in a target ID field. In addition, the identifier of the program which is stored in the program storage unit 13 and is dependent on the program associated with the identifier that is described in the target ID field is described in a dependence destination ID field.

In the example shown in FIG. 2B, a program with an identifier "111" is dependent on a program with an identifier "678." That is, the program with the identifier "111" cooperates with the program with the identifier "678" to achieve the function of the program with the identifier "111."

In the another example shown in FIG. 2B, a program with an identifier "123" is dependent on a program with an identifier "225," a program with an identifier "334," and a program with an identifier "555." That is, the program with the identifier "123" cooperates with the programs with the identifiers "225," "334," and "555" to achieve the function of the program with the identifier "123." As such, one program may be dependent on a plurality of programs.

In the another example shown in FIG. 2B, the program with the identifier "555" which is dependent on the program with the identifier "123" is dependent on a program with an identifier "789." Therefore, the program with the identifier "123" is directly dependent on the programs with the identifiers "225," "334," and "555" and is indirectly dependent on the program with the identifier "789." As such, it is possible to describe the hierarchical structure of the dependence between the programs by describing the dependence destination ID for the target ID using the dependence destination ID as the target ID.

The information stored in the program information storage unit 14 of the program server 10 has been described above. The programs and the dependence between the programs are also stored in the program information storage unit 23 of the client apparatus 20 in the same format as that of the ID table and the dependence table shown in FIGS. 2A and 2B. However, the identifiers of the programs that are installed in order to add functions to the client apparatus 20 and the dependence between the programs are stored in the program information storage unit 23 of the client apparatus 20.

Next, a process of creating a display screen for displaying the dependence between the programs according to the first embodiment will be described. In the first embodiment, for example, when the program that is downloaded from the program server 10 through the network 5 is installed in the client apparatus 20 and when the program installed in order to add functions to the client apparatus 20 is uninstalled, the dependence between a program to be installed or uninstalled and other programs is displayed.

In the first embodiment, it is possible to display the dependence between the program stored in the program storage unit 13 by the program server 10 and programs other than the program installed in the client apparatus 20, even when installation or uninstallation is not performed.

FIG. 3 is a sequence diagram illustrating an example of a process of creating the display screen for displaying the dependence according to the first embodiment. The user operates the input unit 26 of the client apparatus 20 to input an instruction to perform any one of an installation process, an uninstallation process, and a dependence display process. The input unit 26 outputs a dependence display request to the control unit 22 using information indicating input process content as a parameter (SEQ10). Next, a case in which the user operates the input unit 26 to input an instruction to perform the installation process will be described with reference to FIG. 3.

The control unit 22 receives the dependence display request from the input unit 26 and outputs a dependence display creation request to create a dependence display screen to the dependence display creating unit 24 using information indicating process content as a parameter (SEQ11). The dependence display creating unit 24 receives the dependence display creation request from the control unit 22 and outputs a server program acquisition request to acquire the information of the program stored in the program storage unit 13 to the program server 10 (SEQ12).

Hereinafter, appropriately, the program stored in the program storage unit 13 of the program server 10 is referred to as a server program and the program information stored in the program information storage unit 14 is referred to as server program information.

The server program acquisition request is transmitted from the network unit 27 to the program server 10 through the network 5 and is received by the network unit 15 of the program server 10 (SEQ13). The network unit 15 transmits the received server program acquisition request to the program management unit 12 (SEQ14). The program management unit 12 acquires server program information from the program information storage unit 14 in response to the server program acquisition request (SEQ15 and SEQ16).

In this embodiment, it is assumed that the server program information of all of the server programs stored in the program storage unit 13 is acquired from the program information storage unit 14. However, the invention is not limited thereto. For example, the server program acquisition request that is transmitted from the client apparatus 20 to the program server 10 in SEQ13 may include information capable of specifying the client apparatus 20, and the program server 10 may selectively acquire the server program information corresponding to the server program applicable to the specified client apparatus 20.

The server program information acquired in SEQ16 is transmitted from the program management unit 12 to the network unit 15 (SEQ17) and is then transmitted from the network unit 15 to the network unit 27 of the client apparatus 20 (SEQ18). In the client apparatus 20, the network unit 27 receives the server program information transmitted from the program server 10 and transmits the received server program information to the dependence display creating unit 24 (SEQ19).

The dependence display creating unit 24 performs a process of requesting the program server 10 to transmit the server program information of in SEQ12 and acquires the information of the program installed in order to add functions in the client apparatus 20.

Hereinafter, appropriately, the program installed in the client apparatus 20 is referred to as an apparatus program and the program information stored in the program information storage unit 23 is referred to as apparatus program information.

Specifically, when receiving the dependence display creation request from the control unit 22 in SEQ11, the dependence display creating unit 24 requests the program information storage unit 23 of the client apparatus 20 to acquire the program information of the program installed in the client apparatus 20. The apparatus program information is acquired from the program information storage unit 23 in response to the request and the acquired apparatus program information is transmitted to the dependence display creating unit 24 (SEQ30 and SEQ31).

In FIG. 3, the dependence display creating unit 24 acquires the apparatus program information in SEQ31 and acquires the server program information in SEQ19. However, the order of the acquisition processes may be reversed.

The dependence display creating unit 24 determines the dependence between the programs and the installed state of the programs on the basis of the server program information acquired in SEQ19 and the apparatus program information acquired in SEQ31 (SEQ40 and SEQ41).

Specifically, in SEQ40, the dependence display creating unit 24 acquires the dependence between the server program and other programs stored in the program storage unit 13 from the ID table and the dependence table included in the server program information which is acquired in SEQ19. Then, in SEQ41, the dependence display creating unit 24 acquires the information of the program described in the ID table among the apparatus programs and the dependence between the program and other programs, from the ID table and the dependence table included in the apparatus program information that is acquired in SEQ31.

When acquiring the dependence between the apparatus programs and the server programs and the installed state of the programs in the client apparatus 20, the dependence display creating unit 24 creates a dependence display screen for displaying the dependence between the programs on the basis of the acquired information (SEQ42).

In this case, the dependence display creating unit 24 creates the dependence display screen on the basis of the dependence table and information indicating the installed state of the programs, according to whether process content indicated by the parameters of the dependence display creation request transmitted to the dependence display creating unit 24 in SEQ10 and SEQ11 is any one of the installation process, the uninstallation process, and a process of displaying only the dependence.

A display signal for controlling the screen display unit 25 to display the created dependence display screen is output from the dependence display creating unit 24 to the screen display unit 25 (SEQ50). The screen display unit 25 displays the dependence display screen on a display device according to the supplied display signal.

Dependence display screen creating process

Next, a dependence display screen creating process of the dependence display creating unit 24 will be described. First, the control unit 22 or the dependence display creating unit 24 creates a software management screen for selecting any one of the installation process, the uninstallation process, and a dependence browsing process and displays the software management screen on the screen display unit 25. The user can operate the input unit 26 according to the software management screen to select the process.

Figure 4:
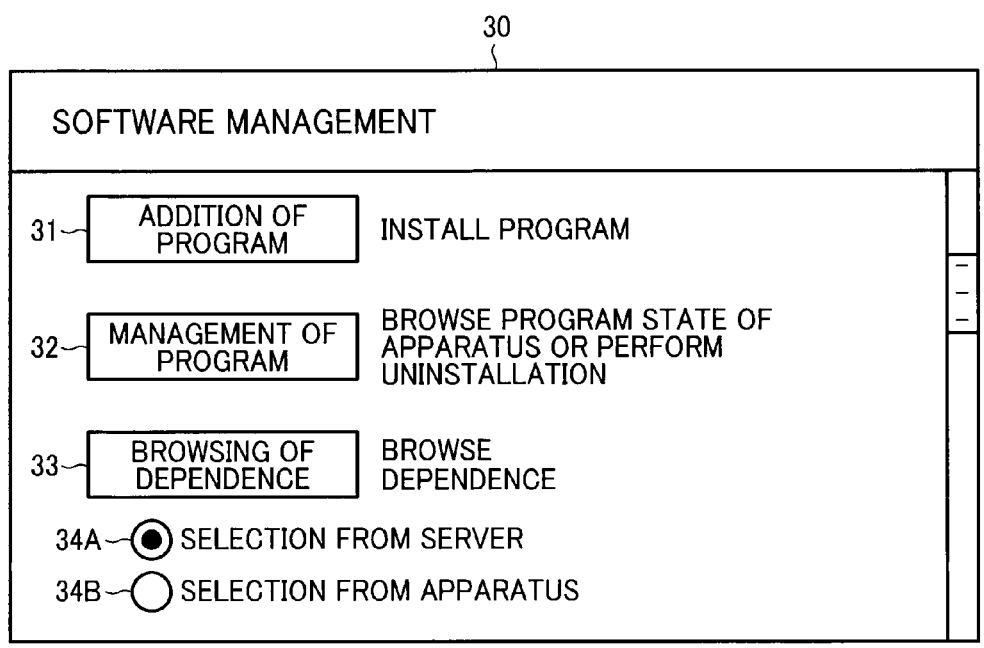
FIG. 4 is a diagram illustrating an example of a software management screen.

FIG. 4 shows an example of a software management screen 30. A program adding button 31, a program management button 32, and a dependence browsing button 33 are arranged on the software management screen 30. The program adding button 31 instructs the installation of the server program in the client apparatus 20. The program management button 32 instructs the uninstallation of the apparatus program installed in the client apparatus 20. The dependence browsing button 33 is for displaying a browsing screen for browsing one of the server program and the apparatus program selected by radio buttons 34A and 34B that are additionally provided.

Display of dependence during installation process

Figure 5:
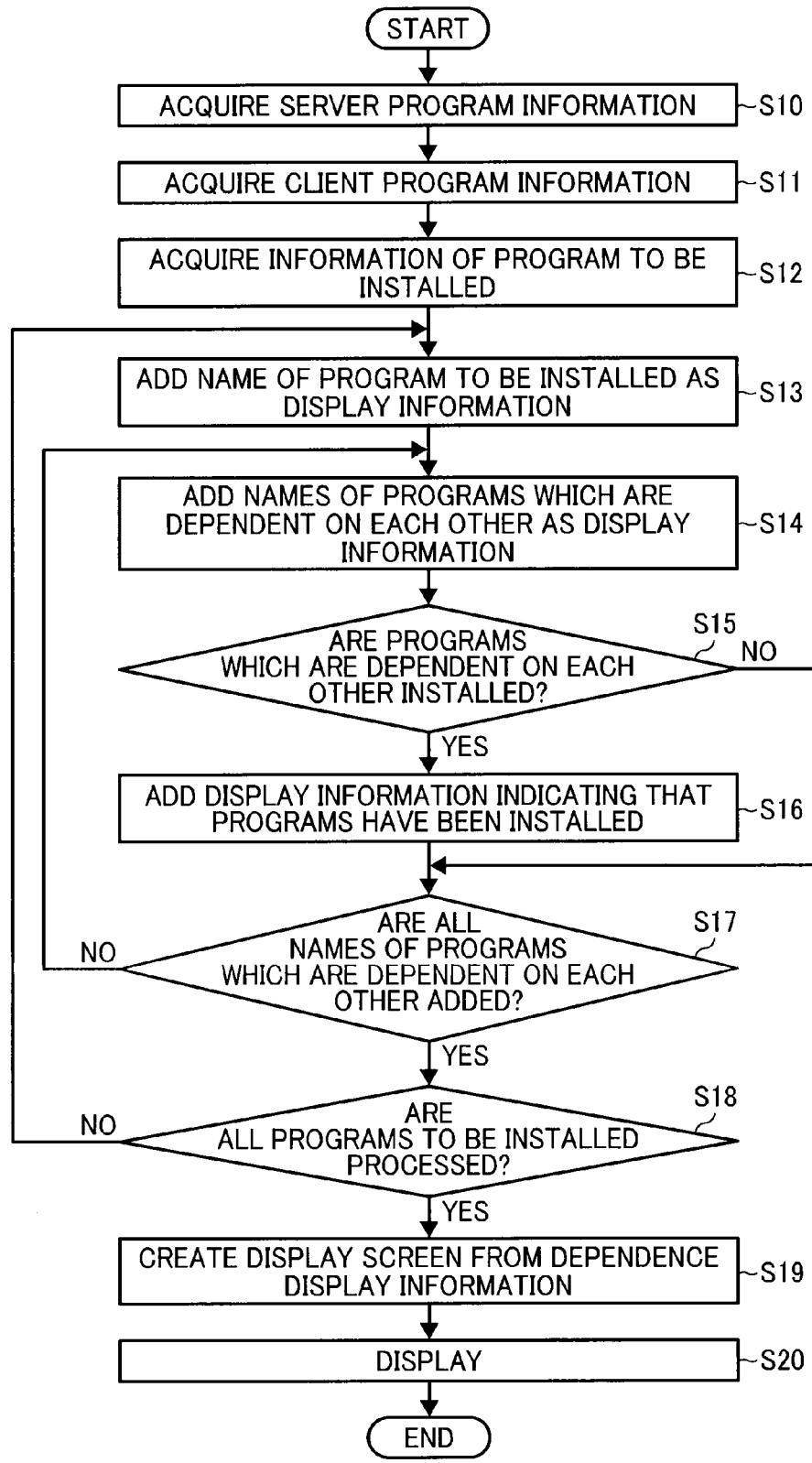
FIG. 5 is a flowchart illustrating an example of a process of creating a dependence display screen when an installation process is instructed.

First, a case in which the installation process is instructed will be described. FIG. 5 is a flowchart illustrating an example of the dependence display screen creating process of the dependence display creating unit 24 when the input unit 26 is used to operate the program adding button 31 to instruct the installation process in SEQ10. When the program adding button 31 is operated, the input unit 26 transmits a dependence display request related to the installation process to the control unit 22.

When receiving the dependence display request from the input unit 26 through the control unit 22, the dependence display creating unit 24 transmits a server program information acquisition request to the program server 10 in order to check the dependence between the programs and acquires the server program information from the program server 10 in Step S10. Then, in Step S11, the dependence display creating unit 24 requests the program information storage unit 23 to transmit apparatus program information in order to determine the program installed in the client apparatus 20 and acquires the apparatus program information from the program information storage unit 23.

Then, in Step S12, the dependence display creating unit 24 acquires information indicating a program to be installed. For example, the dependence display creating unit 24 creates a program adding screen in which a list of server program names is displayed with reference to the ID table included in the server program information that is acquired in Step S10, and displays the created program adding screen on the screen display unit 25.

Figure 6:
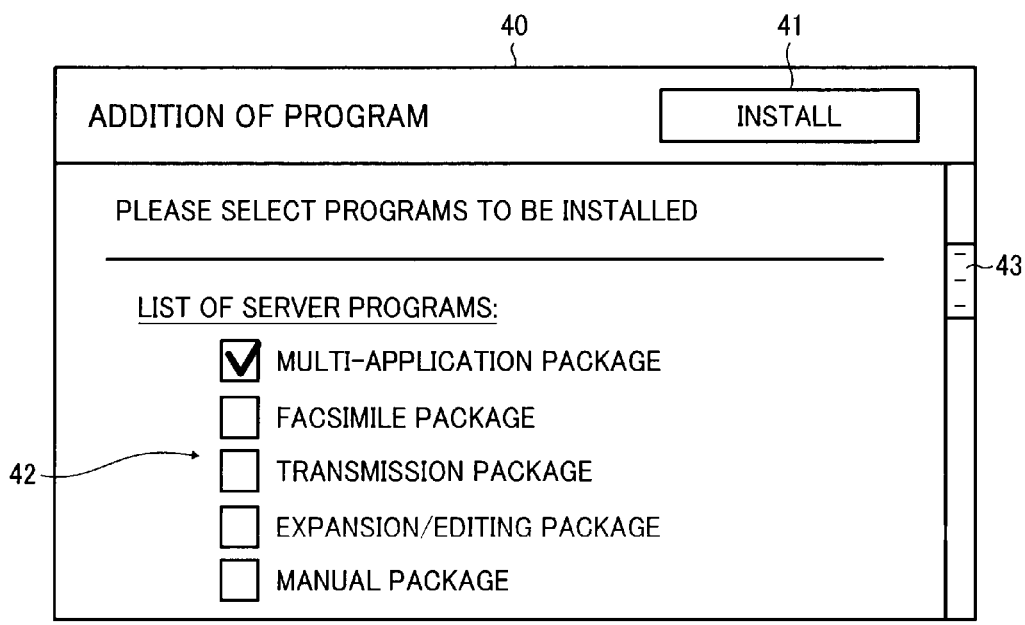
FIG. 6 is a diagram illustrating an example of a program adding screen.

FIG. 6 shows an example of a program adding screen 40. When the program adding button 31 of the software management screen 30 shown in FIG. 4 is operated, Step S10 and Step S11 are performed to display the program adding screen 40 on the screen display unit 25. The names of the server programs extracted from the server program information that is acquired in Step S10 are arranged in the form of a list in a display area 42 of the program adding screen 40. In the example shown in FIG. 6, server program names "multi-application package," "facsimile package," "transmission package," "expansion/editing package," and "manual package" are arranged in the display area 42.

A check box is annexed to each server program name. The user can operate the input unit 26 to check the check box annexed to a desired server program, thereby selecting one or more server programs to be installed in the client apparatus 20. In the example shown in FIG. 6, the check box annexed to the server program "multi-application package" is checked to select the server program "multi-application package" as a server program to be installed.

When the input unit 26 is used to operate an install button 41 after the desired server program is selected, information (for example, an identifier associated with the program) indicating the selected program is transmitted from the input unit 26 to the dependence display creating unit 24 through the control unit 22. After Step S13, the creation of the display screen indicating the dependence between the server programs to be installed is performed.

When there are a large number of acquired server programs and it is difficult to display all of the names of the server programs on the program adding screen 40, the user can operate a scroll button 43 to scroll the display of the program adding screen 40 in the vertical direction such that display content outside the program adding screen 40 is displayed within the program adding screen 40.

Steps S13 to S18 are repeatedly performed for each program to be installed. When acquiring information indicating the program to be installed, the dependence display creating unit 24 acquires the name of the program to be installed with reference to the ID table included in the server program information and adds the name of the program as display information to dependence display information in Step S13.

Steps S14 to S17 are repeatedly performed for other programs that are dependent on one program to be installed. In Step S14, the dependence display creating unit 24 adds the information of one of the server programs that are dependent on one server program to be installed (hereinafter, referred to as a target server program) as display information to the dependence display information.

For example, the dependence display creating unit 24 acquires the dependence between the target server program and other server programs with reference to the dependence table included in the server program information. The dependence display creating unit 24 acquires the names of other acquired server programs with reference to the ID table and uses the acquired names as display information. Hereinafter, other server programs that are dependent on the target server program are referred to as dependent target server programs.

In Step S15, the dependence display creating unit 24 determines whether the dependent target server program is installed in the client apparatus 20. That is, the dependence display creating unit 24 determines whether an identifier identical to the identifier of the dependent target server program is stored in the ID table with reference to the ID table included in the apparatus program information. If it is determined that the identifier is not stored in the ID table, the process proceeds to Step S17.

On the other hand, if it is determined in Step S15 that the identifier identical to the identifier of the dependent target server program is stored in the ID table, the process proceeds to Step S16. In Step S16, the dependence display creating unit 24 adds information indicating that the dependent target server program has been installed as display information to the dependence display information. The information indicating that the dependent target server program has been installed may be associated with a predetermined message or icon indicating the name of the dependent target server program.

In Step S17, the dependence display creating unit 24 determines whether all the names of the dependent target server programs which are dependent on the target server program are added as display information to the dependence display information. If it is determined that there is a dependent target server program whose name has not been added, the dependence display creating unit 24 returns to Step S14 and performs Steps S14 to S17 on the dependent target server program whose name has not been added.

On the other hand, if it is determined in Step S17 that all the names of the dependent target server programs which are dependent on the target server program are added, the dependence display creating unit 24 proceeds to Step S18. In Step S18, the dependence display creating unit 24 determines whether all of the target server programs that are selected as installation targets are processed. If it is determined that all of the target server programs are not processed, the process returns to Step S13 and Steps S13 to S18 are performed on the target server programs that have not been processed.

On the other hand, if it is determined in Step S18 that all of the target server programs that are selected as installation targets are processed, the dependence display creating unit 24 proceeds to Step S19.

In Step S19, the dependence display creating unit 24 creates the dependence display screen for displaying dependence from the dependence display information. For example, the dependence display creating unit 24 arranges the names of the target server programs included in the dependence display information and the names of the dependent target server programs which are included in the dependence display information and are dependent on the target server programs on the screen such that the dependence between the names is clear, thereby creating the dependence display screen.

In Step S20, the dependence display creating unit 24 supplies a display signal for displaying the dependence display screen created in Step S19 to the screen display unit 25 such that the dependence display screen is displayed on the screen display unit 25.

Figure 7:
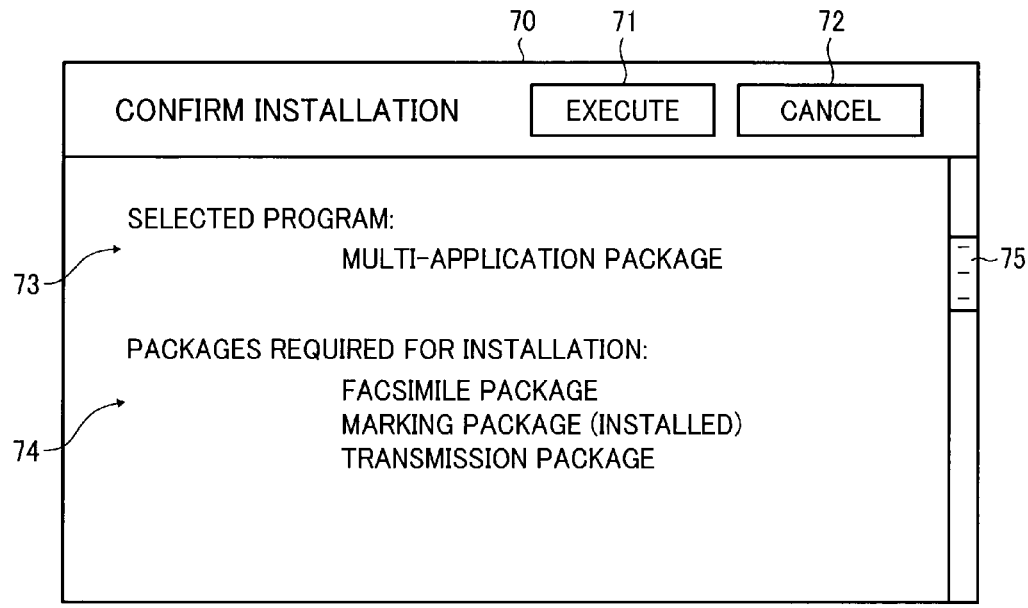
FIG. 7 is a diagram illustrating an example of the dependence display screen in the installation process.

FIG. 7 shows an example of a dependence display screen 70 which is created in Step S19 in the installation process. The name of the target server program is arranged as a "selected program" in a display area 73. The name of the dependent target server program that is dependent on the target server program displayed in the display area 73 is arranged as a "package required for installation" in a display area 74 adjacent to the display area 73.

In the example shown in FIG. 7, a "multi-application package" is selected as the target server program, and a "facsimile package," a "marking package," and a "transmission package" are shown as the dependent target server programs that are dependent on the target server program. In addition, among the dependent target server programs, the "marking package" indicates that a message indicating that dependent target server program has been "installed" in the client apparatus 20 is added to the name of the dependent target server program.

As shown in FIG. 7, the name of a program and the name of another program that is dependent on the program form a pair and are arranged and displayed so as to be adjacent to each other. In this way, it is easy for the user to check the dependence between the programs.

In the example shown in FIG. 7, an execute button 71 and a cancel button 72 are arranged on the upper right side of the dependence display screen 70. The user can operate the input unit 26 to click the execute button 71, thereby installing the programs with the names displayed in display areas 73 and 74. The cancel button 72 instructs the cancellation of the installation process.

For example, when information indicating that the execute button 71 has been operated is transmitted from the input unit 26 to the control unit 22, the control unit 22 requests the dependence display creating unit 24 to transmit the identifier of the target server program whose name is displayed in the display area 73. In addition, the control unit 22 requests the dependence display creating unit 24 to transmit the identifier of the dependent target server program that has not been installed among the dependent target server programs whose names are displayed in the display area 73. The control unit 22 transmits the identifiers which are acquired in response to the requests to the program server 10 through the network unit 27.

In the program server 10, the network unit 15 receives the identifiers of the server programs transmitted from the client apparatus 20 and transmits the identifiers to the program management unit 12. The program management unit 12 extracts the server programs corresponding to the identifiers transmitted from the network unit 15 from the program storage unit 13 and transmits the extracted server programs from the network unit 15 to the client apparatus 20.

In the client apparatus 20, the network unit 27 receives the transmitted server programs and transmits the received server programs to the control unit 22. The control unit 22 installs the server programs in the client apparatus 20 in a predetermined sequence. After the server programs are installed, the control unit 22 updates the ID table and the dependence table in the program information storage unit 14 and reflects the information of the installed server programs to the tables.

As described above, it is possible to select a plurality of target server programs to be installed. When a plurality of target server programs is selected, the plurality of selected target server programs and the dependent target server programs that are dependent on each of the plurality of target server programs are arranged and displayed on the dependence display screen 70 such that the dependence therebetween is clear. In the example shown in FIG. 7, sets of the display areas 73 and 74 corresponding to the number of selected target server programs are displayed.

In this case, it is more preferable that the target server programs to be installed be selected from a plurality of target server programs. For example, a check box is additionally displayed for the name of each of the plurality of target server programs displayed in the display area 73 and the target server program whose check box is checked by the operation of the input unit 26 is selectively installed. It is preferable that the ID table and the dependence table be updated each time the installation of one target server program is completed and the display content of the dependence display screen 70 be updated.

When a plurality of target server programs to be installed is selected and it is difficult to display the program names thereof on the dependence display screen 70 at once, the user can operate a scroll button 75 to scroll the display of the dependence display screen 70 in the vertical direction such that display content outside the dependence display screen 70 is displayed within the dependence display screen 70.

Figure 8:
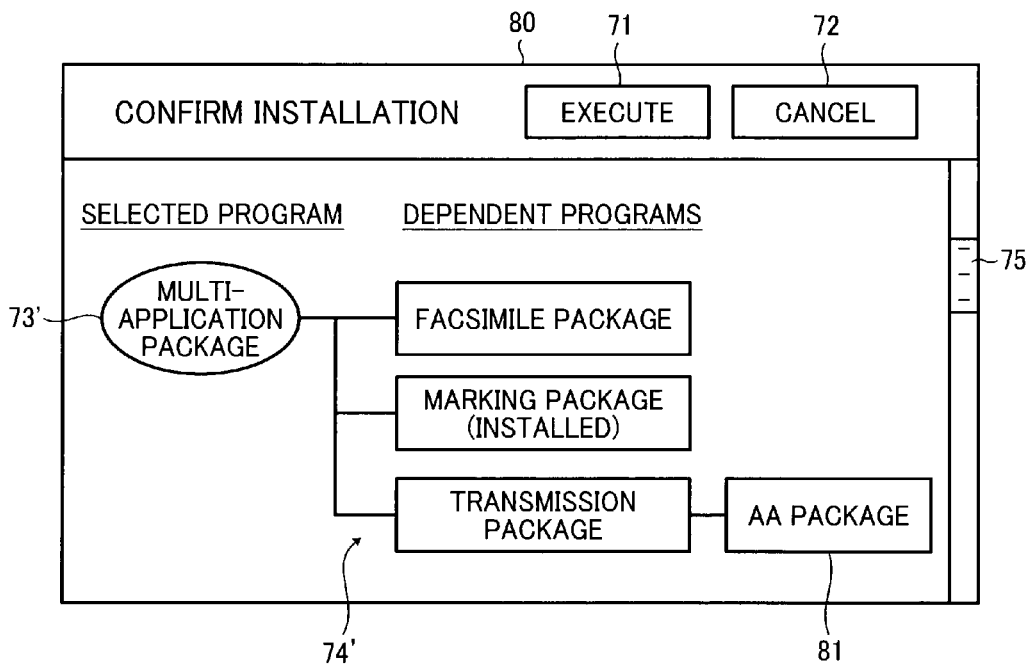
FIG. 8 is a diagram illustrating another example of the dependence display screen.
Figure 9:
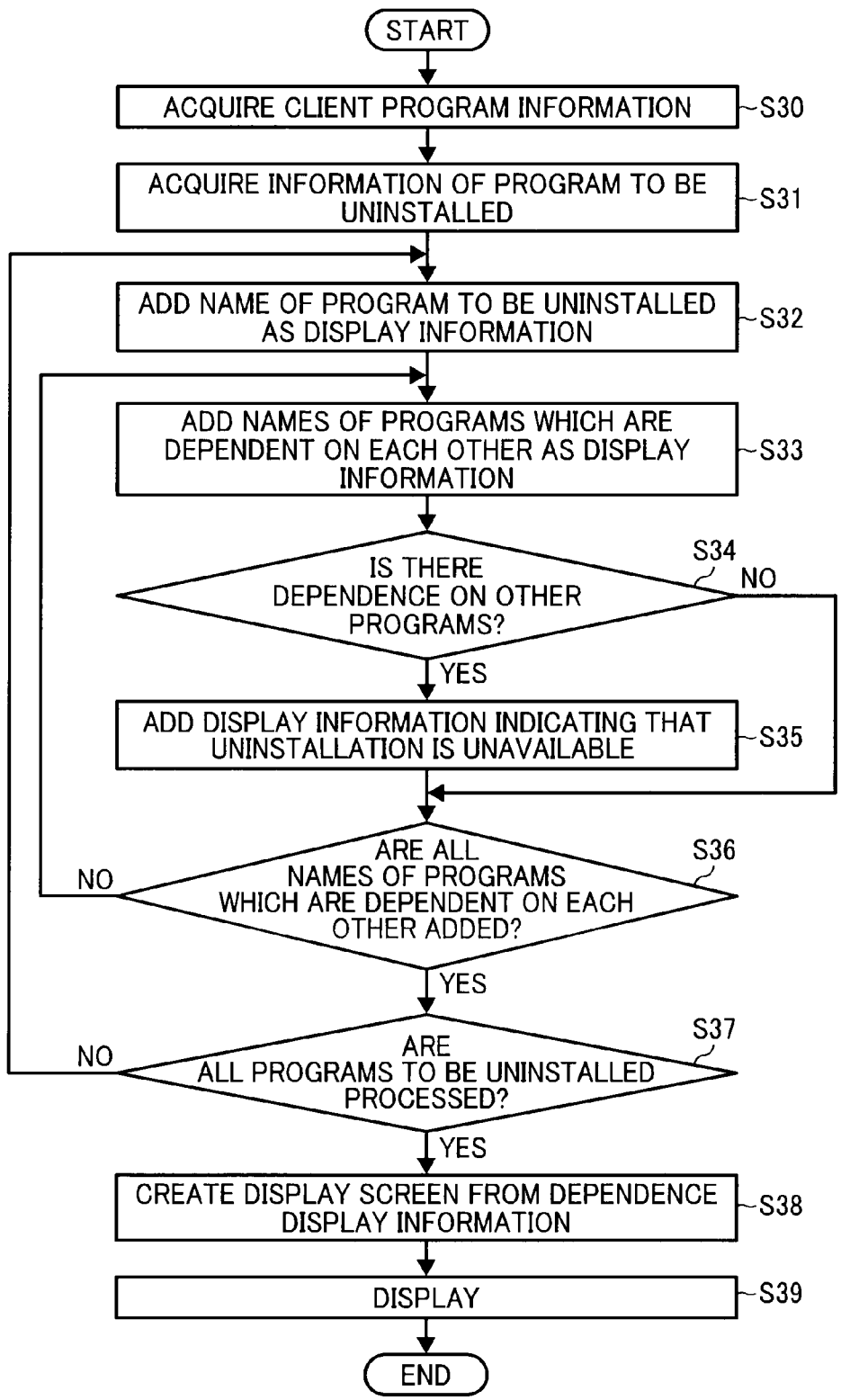
FIG. 9 is a flowchart illustrating an example of a process of creating a dependence display screen when an uninstallation process is instructed.

FIG. 8 shows another example of the dependence display screen. In FIG. 8, the same components as those in FIG. 7 are denoted by the same reference numerals and a detailed description thereof will not be repeated. In the example shown in FIG. 8, a dependence display screen 80 visually lays out the dependence between the programs in a tree structure. That is, the name of the target server program to be installed is arranged as the root of the tree structure in a display area 73', and the names of the dependent target server programs that are directly dependent on the target server program are arranged in a display area 74' as hierarchies immediately below the root. In addition, in the case of the layout using the tree structure, as in display 81, it is easy to display a program that is indirectly dependent on the target server program by the hierarchical structure. Display of dependence during uninstallation process Next, a case in which the uninstallation process is instructed will be described. FIG. 9 is a flowchart illustrating an example of a process of creating a dependence display screen by the dependence display creating unit 24 when the input unit 26 is used to operate the program management button 32, thereby instructing the uninstallation process, in SEQ10. When the program management button 32 is operated, the input unit 26 transmits a dependence display request related to the uninstallation process to the control unit 22.

When receiving the dependence display request from the input unit 26 through the control unit 22, in Step S30, the dependence display creating unit 24 determines the apparatus program installed in the client apparatus 20 and acquires apparatus program information from the program information storage unit 23 in order to check the dependence between the installed apparatus program and other apparatus programs.

In Step S31, the dependence display creating unit 24 acquires information (for example, an identifier) indicating the program to be uninstalled. For example, the dependence display creating unit 24 creates a program management screen on which a list of apparatus program names is displayed, with reference to the ID table that is included in the apparatus program information acquired in Step S30 and displays the created program management screen on the screen display unit 25.

FIG. 10 shows an example of a program management screen 50. When the program management button 32 on the software management screen 30 shown in FIG. 4 is operated, Step S30 is performed and the program management screen 50 is displayed on the screen display unit 25. The names of the apparatus programs extracted from the apparatus program information that is acquired in Step S30 are arranged in the form of a list in a display area 52 of the program management screen 50. In the example shown in FIG. 10, apparatus program names "multi-application package," "facsimile package," "transmission package," "expansion/editing package," and "manual package" for apparatus programs installed in the client apparatus 20 are arranged in the display area 52.

A check box is annexed to each apparatus program name. The user can operate the input unit 26 to check the check box annexed to a desired apparatus program, thereby selecting one or more apparatus programs to be uninstalled from the client apparatus 20.

When the input unit 26 is used to operate an uninstall button 51 after a desired apparatus program is selected, information indicating the selected program is transmitted from the input unit 26 to the dependence display creating unit 24 through the control unit 22 and a screen for displaying the dependence between the apparatus programs to be uninstalled is created after Step S32. The function of a scroll button 53 is the same as that of the scroll button 43 described with reference to FIG. 6 and thus a description thereof will not be repeated.

Steps S32 to S37 are repeatedly performed for each apparatus program to be uninstalled. When acquiring information indicating the apparatus program to be uninstalled, in Step S33, the dependence display creating unit 24 acquires the name of the apparatus program to be uninstalled with reference to the ID table included in the apparatus program information and adds the name of the apparatus program as display information to the dependence display information.

Steps S33 to S36 are repeatedly performed on each of other apparatus programs that are dependent on one apparatus program to be uninstalled. In Step S34, the dependence display creating unit 24 adds the information of one of the apparatus programs that are dependent on one apparatus program to be uninstalled (hereinafter, referred to as a target apparatus program) as display information to the dependence display information.

For example, the dependence display creating unit 24 acquires the dependence between the target apparatus program and other apparatus programs with reference to the dependence table included in the apparatus program information. The dependence display creating unit 24 acquires the names of the acquired other apparatus programs with reference to the ID table and uses the acquired names as display information. Hereinafter, other apparatus programs that are dependent on the target apparatus program are referred to as dependent target apparatus programs.

In Step S34, the dependence display creating unit 24 determines whether the dependent target apparatus programs are dependent on other apparatus programs except for the target apparatus program that is dependent on the dependent target apparatus programs with reference to the dependence table included in the apparatus program information. If it is determined that the dependent target apparatus programs are not dependent on other apparatus programs, the process proceeds to Step S36.

A case in which a plurality of programs is dependent on a common program is considered. For example, as hatched in FIG. 11, it is assumed that a common program with an identifier "555" is dependent on a program with an identifier "123" and a program with an identifier "666." In this case, during the uninstallation of the program with the identifier "123," when the program with the identifier "555" which is dependent on the program with the identifier "123" is also uninstalled, the program with the identifier "666" that is dependent on the program with the identifier "555" cannot be executed.

If it is determined in Step S34 that the dependent target apparatus programs are dependent on other apparatus programs except for the target apparatus program that is dependent on the dependent target apparatus programs, the dependence display creating unit 24 proceeds to Step S35 and adds information indicating that the uninstallation of the dependent target apparatus programs are unavailable as display information to the dependence display information. For example, information indicating that uninstallation has been completed may be associated with a predetermined message or icon indicating the dependent target apparatus program.

In Step S36, the dependence display creating unit 24 determines whether the names of all of the dependent target apparatus programs which are dependent on the target apparatus program are added as display information to the dependence display information. If it is determined that there is a dependent target apparatus program whose name has not been added, the dependence display creating unit 24 returns to Step S33 and performs Steps S33 to S36 on the dependent target apparatus program whose name has not been added.

On the other hand, if it is determined in Step S36 that the names of all of the dependent target apparatus programs which are dependent on the target apparatus program are added, the dependence display creating unit 24 proceeds to Step S37. In Step S37, the dependence display creating unit 24 determines whether all of the target apparatus programs that are selected as uninstallation targets are processed. If it is determined that all of the target apparatus programs are not processed, the process returns to Step S32 and Steps S32 to S37 are performed on the target apparatus programs that have not been processed.

On the other hand, if it is determined in Step S37 that all of the target apparatus programs that are selected as uninstallation targets are processed, the dependence display creating unit 24 proceeds to Step S38.

In Step S38, the dependence display creating unit 24 creates the dependence display screen for displaying dependence from the dependence display information in the same way as that described in Step S19 of the flowchart shown in FIG. 5. That is, the dependence display creating unit 24 arranges the name of the target apparatus program included in the dependence display information and the names of the dependent target apparatus programs which are included in the dependence display information and are dependent on the target apparatus program on the screen such that the dependence between the names is clear, thereby creating the dependence display screen.

In Step S39, the dependence display creating unit 24 supplies a display signal for displaying the dependence display screen created in Step S38 to the screen display unit 25 such that the dependence display screen is displayed on the screen display unit 25.

In the uninstallation process, the dependence display screen displayed on the screen display unit 25 may be displayed in a list structure or a tree structure, substantially similar to the dependence display screens 70 and 80 in the installation process described with reference to FIGS. 7 and 8 except for, for example, text, such as a title, or a message indicating that uninstallation is unavailable.

When the input unit 26 is used to operate an execute button on the dependence display screen related to the uninstallation process, the target apparatus program and the dependent target apparatus programs that are dependent on the target apparatus program are uninstalled from the client apparatus 20.

For example, when information indicating that a button for performing the uninstallation process has been operated is transmitted from the input unit 26 to the control unit 22, the control unit 22 requests the dependence display creating unit 24 to transmit the identifier of the target apparatus program to be uninstalled. In addition, the control unit 22 requests the dependence display creating unit 24 to transmit the identifier of the dependent target apparatus program that can be uninstalled, among the dependent target apparatus programs that are dependent on the target apparatus program.

The control unit 22 uninstalls the apparatus programs corresponding to the identifiers which are received from the dependence display creating unit 24 in response to the requests from the client apparatus 20 in a predetermined sequence. After the apparatus programs are uninstalled, the control unit 22 updates the ID table and the dependence table of the program information storage unit 23 and reflects the information of the uninstalled apparatus programs to the tables.

A process when a plurality of target apparatus programs to be uninstalled is selected is performed in the same way as the installation process and thus a detailed description thereof will not be repeated.

Display of dependence during dependence browsing process

Next, a case in which the dependence browsing process is instructed will be described. When the input unit 26 is used to operate the dependence browsing button 33 on the software management screen 30 shown in FIG. 4 in SEQ10, the dependence browsing process is instructed. When one of the radio buttons 34A and 34B is selected and the dependence browsing button 33 is operated, the input unit 26 transmits a dependence display request for displaying the dependence between the programs selected by the selected radio button 34A or 34B to the control unit 22.

Specifically, when the radio button 34A that instructs "selection from the server" is selected, the input unit 26 transmits the dependence display request to the dependence display creating unit 24 through the control unit 22, using process content indicating the dependence browsing process and information indicating the acquisition of the server program information as parameters. Then, the dependence display creating unit 24 acquires server program information from the program server 10 according to the sequences SEQ12 to SEQ19 shown in FIG. 3.

Then, the dependence display creating unit 24 acquires the names of the server programs which are stored in the program storage unit 13 by the program server 10 and the identifiers serving as target IDs, with reference to the ID table included in the acquired server program information. In addition, the dependence display creating unit 24 acquires an identifier, serving as a dependence destination ID, for each of the identifiers acquired from the ID table with reference to the dependence table included in the server program information.

When the radio button 34B that instructs "selection from the apparatus" is selected, the same process as described above is performed. In this case, the input unit 26 transmits the dependence display request to the dependence display creating unit 24 through the control unit 22, using process content indicating the dependence browsing process and information indicating the acquisition of the apparatus program as parameters. Then, the dependence display creating unit 24 acquires apparatus program information from the program information storage unit 23 according to the sequences SEQ30 and SEQ31 shown in FIG. 3.

Then, the dependence display creating unit 24 acquires the names of the apparatus programs installed in the client apparatus 20 and the identifiers serving as target IDs, with reference to the ID table included in the acquired apparatus program information. In addition, the dependence display creating unit 24 acquires an identifier, serving as a dependence destination ID, for each of the identifiers acquired from the ID table with reference to the dependence table included in the apparatus program information.

Figure 12:
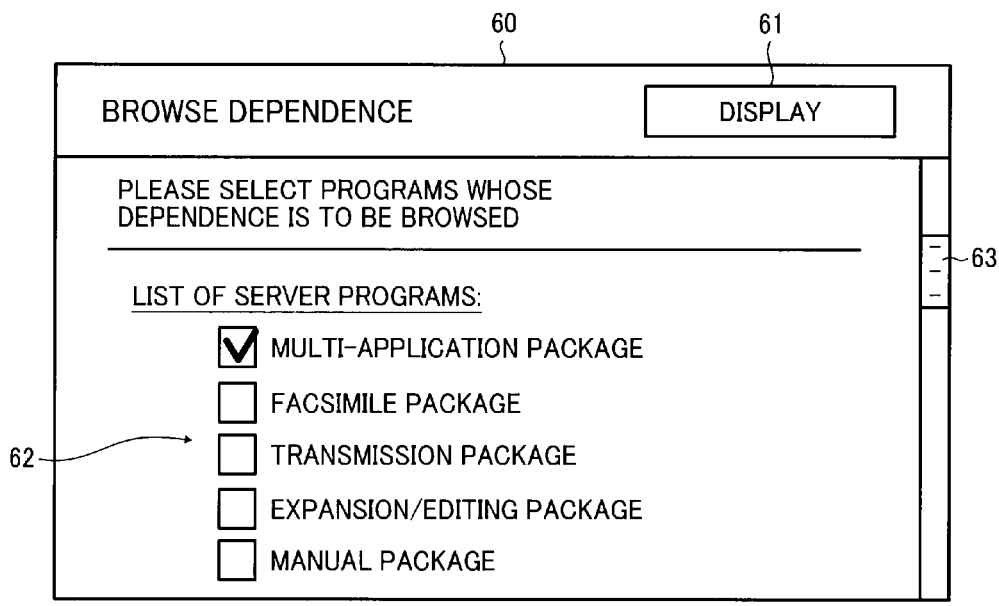
FIG. 12 is a diagram illustrating an example of a selection screen for selecting a program that browses dependence.

When the identifiers of the server programs or the apparatus programs are acquired in this way, the dependence display creating unit 24 creates a selection screen 60 for selecting a program for browsing the dependence, as shown in FIG. 12, and displays the selection screen 60 on the screen display unit 25. Similar to the program adding screen 40 shown in FIG. 6, in the selection screen 60, the names of the acquired server programs or apparatus programs are arranged in a display area 62 in the form of a list and a check box is annexed to each of the program names. A scroll button 63 is used to scroll the selection screen 60 in the vertical direction such that information outside the screen is displayed within the screen.

When the user operates the input unit 26 to check the check box annexed to the name of the program whose dependence is to be browsed and operates a display button 61, the dependence display creating unit 24 creates a dependence browsing screen for browsing other programs that are dependent on the name of the program corresponding to the checked check box.

That is, the dependence display creating unit 24 arranges the name of the program corresponding to the checked check box and the names of other programs which are dependent on the program on the screen such that the dependence between the names is clear, thereby creating the dependence display screen related to the dependence browsing process, similar to the operation described with reference to FIGS. 7 and 8. The dependence display screen may be the display of the list shown in FIG. 7 or the layout using the tree structure shown in FIG. 8.

As described above, according to the first embodiment, in the client apparatus 20 or the program server 10, information indicating the installed or stored program is associated with information indicating other programs that are dependent on the program.

Therefore, when the program stored in the program server 10 is installed in the client apparatus 20 or when the program is uninstalled from the client apparatus 20, it is possible to display a program to be processed and other programs that are dependent on the program to be processed such that the dependence between the programs is clear.

Second Embodiment

Next, a second embodiment of the invention will be described. The second embodiment is an example in which the first embodiment is applied to a software distribution system that distributes software from a server to a multi-function machine through a network.

Figure 13:
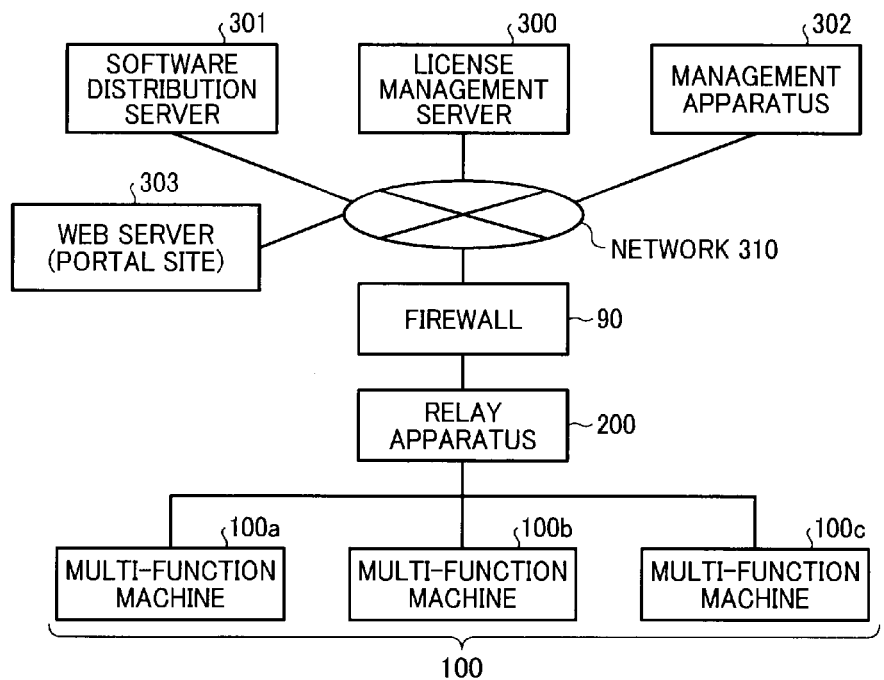
FIG. 13 is a diagram illustrating an example of the network structure of a software distribution system according to a second embodiment of the invention.

FIG. 13 is a diagram illustrating an example of the structure of the software distribution system according to the second embodiment. As shown in FIG. 13, in the software distribution system, a relay apparatus 200, a license management server 300, a software distribution server 301, a management apparatus 302 serving as a software management apparatus, and a web server 303 are connected to one another through a network 310, such as the Internet. The network 310 corresponds to the network 5 according to the first embodiment.

A firewall 90 is provided between the relay apparatus 200 and the network 310. A plurality of multi-function machines 100a, 100b, and 100c is connected to the relay apparatus 200. Hereinafter, the multi-function machine that is not specified is simply referred to as a multi-function machine 100. The multi-function machine 100 corresponds to the client apparatus 20 according to the first embodiment.

The firewall 90 monitors data communication with the outside and detects and cuts illegal access such that the third party does not illegally access the relay apparatus 200 through an external network, such as a public line or the Internet.

The software distribution server 301 stores software programs, which are software packages including various kinds of applications executed in the multi-function machine 100, and distributes the software programs to the multi-function machine 100 through the relay apparatus 200. The software distribution server 301 corresponds to the program server 10 according to the first embodiment and the software program distributed by the software distribution server 301 corresponds to the server program according to the first embodiment.

The license management server 300 manages the license (right to use) of the software program of the application that is provided by the software distribution server 301 and is then installed in the multi-function machine 100, or the license (right to use) of the function performed by the multi-function machine 100 through the relay apparatus 200.

The web server 303 has a portal site for providing software, such as applications. The user uses a PC (Personal Computer) (not shown) or the multi-function machine 100 to access the portal site of the web server 303 and purchases desired application software. When the user purchases software from the web server 303, the apparatus ID of the multi-function machine 100 that is designated as an installation target, the product name and product key of the purchased software, and an installation request are transmitted from the web server 303 to the management apparatus 302.

The management apparatus 302 remotely manages the multi-function machine 100 through the relay apparatus 200. Specifically, the management apparatus 302 is a server apparatus that is provided in, for example, a service center of a multi-function machine manufacturer or a service provider. When receiving the installation request from the web server 303, the management apparatus 302 receives, for example, the URL of the acquisition destination of software to be installed or the URL of the acquisition destination of dependent software from the software distribution server 301, determines software to be installed and dependent software required for the multi-function machine 100 with reference to apparatus information indicating the conditions of the software installed in the multi-function machine 100 which is designated as an installation destination, and transmits an installation request to the relay apparatus 200.

The relay apparatus 200 relays the process performed between the software distribution server 301 and the license management server 300, and the multi-function machine 100. Specifically, the relay apparatus 200 collects the apparatus information indicating the conditions of the software installed in each multi-function machine 100 from the multi-function machine 100 at a predetermined interval and transmits the apparatus information of each multi-function machine 100 to the management apparatus 302.

The relay apparatus 200 performs a process of requesting the software distribution server 301 to transmit a software program to be installed and receiving the software program or a process of requesting the license management server 300 to transmit the license of software to be installed and receiving the license. That is, in the first embodiment, the network unit 27 of the client apparatus 20 communicates with the network unit 15 of the program server 10 through the network 5. However, in the second embodiment, the multi-function machine communicates with the software distribution server through the relay apparatus 200 as well as the network. In addition, the relay apparatus 200 transmits the software program, the license, and a software installation request to the multi-function machine 100 and installs the software in the multi-function machine 100.

The multi-function machine 100 is an apparatus having a plurality of functions, such as copy, facsimile, and printer functions, and is connected to the relay apparatus 200 by a local network such as a LAN. In FIG. 13, three multi-function machines 100a, 100b, and 100c are connected to the network, but the invention is not limited thereto. For example, one, two, or four or more multi-function machines may be connected to the network. The multi-function machine 100 includes an application installation control unit that installs software designated by the installation request when receiving the software program, the license, and the software installation request from the relay apparatus 200.

Figure 14:
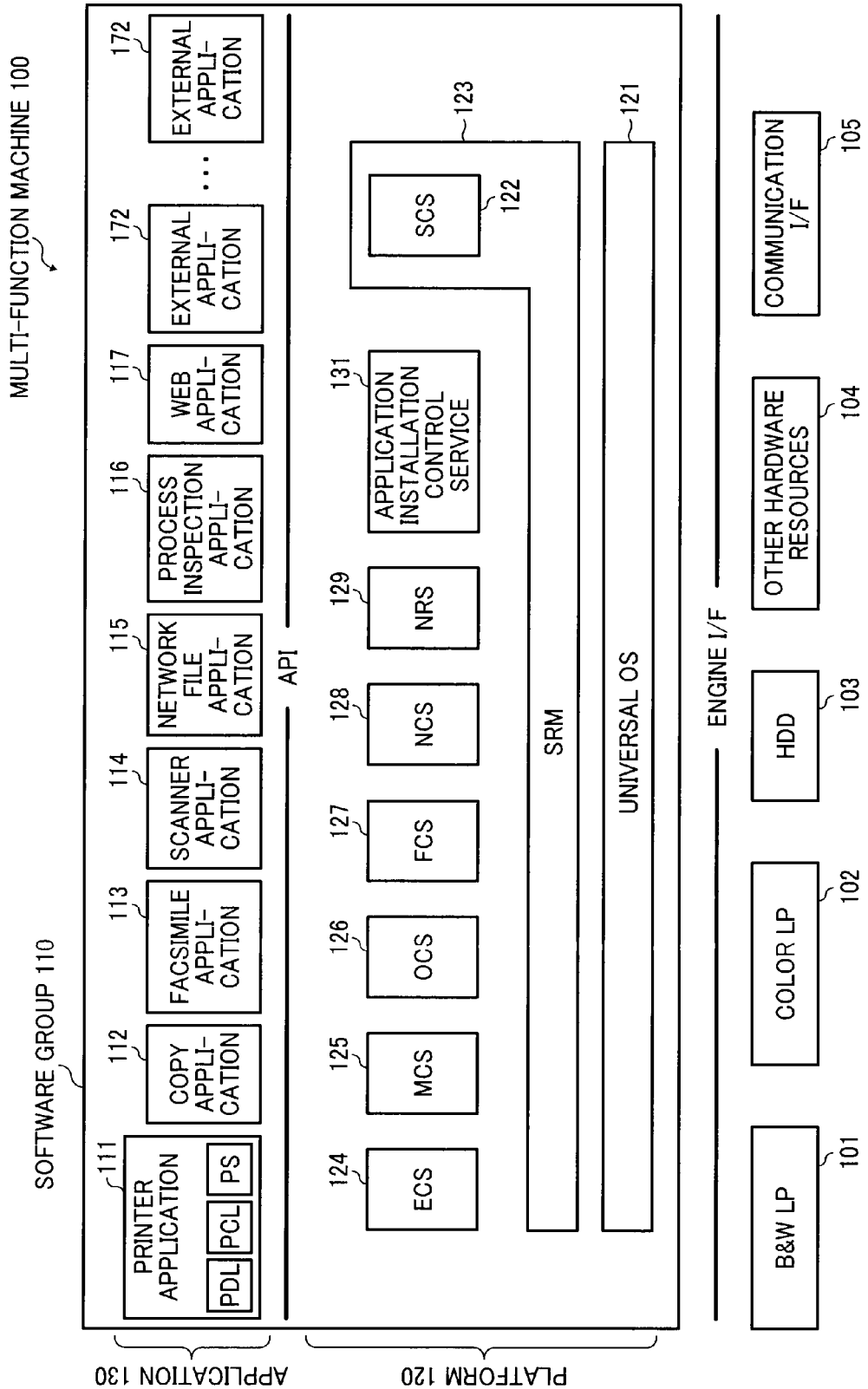
FIG. 14 is a block diagram illustrating an example of the functional structure of a multi-function machine according to the second embodiment of the invention.

Next, the multi-function machine 100 will be described. FIG. 14 is a block diagram illustrating an example of the functional structure of the multi-function machine 100 according to the second embodiment. As shown in FIG. 14, the multi-function machine 100 includes a black-and-white laser printer (B&W LP) 101, a color laser printer (Color LP) 102, a hard disk drive (HDD) 103, other hardware resources 104, such as a scanner, a facsimile, and a memory, a communication interface (I/F) 105, and a software group 110 including a platform 120 and applications 130.

In the multi-function machine 100, the HDD 103 stores the apparatus information, the software packages of the applications downloaded from the software distribution server 301, a firmware package, package information, instruction information indicating the operation instruction of the installation process, and the license file of the applications downloaded from the license management server 300. In addition, the progress of the installation process is stored in the HDD 103. The apparatus program information according to the first embodiment is also stored in the HDD 103.

In the first embodiment, the server program is installed in the client apparatus 20. However, in the second embodiment, the server program is stored in the HDD 103 in a predetermined sequence, thereby being installed in the multi-function machine 100.

The platform 120 includes a universal OS 121 and a system resource manager (SRM) 123 that performs a control service for interpreting a process request from an application and generating a request to acquire hardware resources and manages one hardware resource or a plurality of hardware resources to arbitrate the acquisition request from the control service.

The control service is formed by a plurality of service modules and includes a system control service (SCS) 122, an engine control service (ECS) 124, a memory control service (MCS) 125, an operation panel control service (OCS) 126, a facsimile control service (FCS) 127, a network control service (NCS) 128, a new remote service (NRS) 129, and an application installation control service 131. The platform 120 includes an application program interface (API) that can receive a process request from the application 130 by a predetermined function.

The universal OS 121 is a universal operating system, such as UNIX (registered trademark), and executes the software components of the platform 120 and the application 130 as individual processes in parallel. The control unit 22 of the client apparatus 20 according to the first embodiment is included in, for example, the universal OS 121.

The process of the SRM 123 controls the system and manages resources together with the SCS 122. The process of the SRM 123 performs arbitration and parallel control in response to a request from the upper layer using hardware resources, such as an engine, a memory, an HDD file, a host I/O (for example, a centronics I/F, a network I/F, an IEEE 1394 I/F, and an RS232C I/F), of a scanner unit or a printer unit.

Specifically, the SRM 123 determines whether the requested hardware resource is available, that is, whether the hardware resource is being used in response to other requests. If it is determined that the requested hardware resource is available, the SRM 123 transmits a notice indicating that the requested hardware resource is available to the upper layer. The SRM 123 schedules the use of the hardware resources in response to a request from the upper layer and directly performs the requested content (for example, the transfer of sheets and the formation of images by a printer engine, the allocation of a memory, and the creation of a file).

The process of the SCS 122 performs operations, such as application management, the control of an operating unit, the display of a system screen, LED display, resource management, and interrupt application control. The process of the ECS 124 controls the engines of the black-and-white laser printer (B&W LP) 101, the color laser printer (Color LP) 102, and the other hardware resources 104 including a scanner and a facsimile. The process of the MCS 125 performs operations such as the acquisition and release of an image memory, the use of the hard disk device (HDD), and the compression and decompression of image data.

The process of the FCS 127 provides an API for performing the transmission/reception of facsimile data to/from each application layer of a system controller through PSTN/ISDN, the registration/citation of various kinds of facsimile data managed by a backup SRAM (BKM), the reading of facsimile data, the reception and printing of facsimile data, and the integrated transmission/reception.

The process of the NCS 128 provides a service common to the applications requiring a network I/O. The process of the NCS 128 performs a relay operation when data received from the network by each protocol is sorted to each application or when data is transmitted from the application to the network.

The process of the OCS 126 controls an operation panel serving as an information communication unit between the operator (user) and a main control unit. The OCS 126 includes an OCS process portion that acquires the pressing of a key on the operation panel (or a touch operation) as a key event and transmits a key event function corresponding to the acquired key event to the SCS 122 and an OCS library portion in which a drawing function for drawing and outputting various kinds of screens on the operation panel in response to a request from the application 130 or the control service or other functions for controlling the operation panel are registered in advance. The OCS library is linked and mounted to each module of the application 130 and the control service. The entire OCS 126 may be operated as a process or the entire OCS 126 may be configured as an OCS library.

The process of the application installation control service 131 transmits information related to software, such as applications installed in the multi-function machine 100, or the information of the apparatus as apparatus information to the management apparatus 302 at a predetermined interval. When receiving an installation request from the management apparatus 302, the process of the application installation control service 131 requests the software distribution server 301 to distribute software with the product ID designated by the installation request, receives software to be installed from the software distribution server 301, and installs the received software. In addition, when receiving the installation request from the management apparatus 302, the process of the application installation control service 131 requests the license management server 300 to transmit the license of the software with the product ID designated by the installation request and acquires the license from the license management server 300.

The dependence display creating unit 24 of the client apparatus 20 according to the first embodiment is included in the application installation control service 131.

The process of the NRS 129 has a scheduler function and a function related to apparatus remote management through the network, such as a function of exchanging data when data communication is performed through the network.

The application 130 includes a printer application 111, which is an application for a printer having a page description language (PDL), a printer control language (PCL), and a post script (PS), a copy application 112, which is an application for a copy, a facsimile application 113, which is an application for a facsimile, a scanner application 114, which is an application for a scanner, a network file application 115, which is an application for a network file, a process inspection application 116, which is an application for process inspection, and a web application 117 that operates as a web server (http server) with respect to a client terminal, such as a PC connected to the Internet, and displays various kinds of screens on a web browser operated on the client terminal.

Each process of the application 130 and each process of the control service realize user services related to an image forming process by a copying machine, a printer, a scanner, and a facsimile and so on, while performing communication between the processes using the calling-out of functions, the transmission of the return values of the functions, and the transmission/reception of a message.

As such, the multi-function machine 100 according to the second embodiment includes a plurality of applications 130 and a plurality of control services which are operated as processes. One or more threads are generated in each process and parallel execution is performed for each thread. The control service provides a common service to the applications 130. Therefore, the plurality of processes provides user services related to an image forming process by a copying machine, a printer, a scanner, and a facsimile and so on, while performs communication therebetween using the parallel operation of the processes and the parallel operation of the threads, thereby cooperating with each other.

In the multi-function machine 100, the third party, such as the client of the multi-function machine 100 or a third vendor, can develop and mount an external application 172 on the application layer on the control service layer. The external application 172 is a server program that is downloaded from the software distribution server 301 by the application installation control service 131 and is then installed. FIG. 14 shows the execution of the external application 172.

In the multi-function machine 100 according to the second embodiment, the processes of a plurality of applications 130 and the processes of a plurality of control services are performed. However, the process of a single application 130 and the process of a single control service may be performed. In addition, the applications 130 may be individually added or removed. That is, as described above, the external application 172 may be installed and uninstalled.

Figure 15:
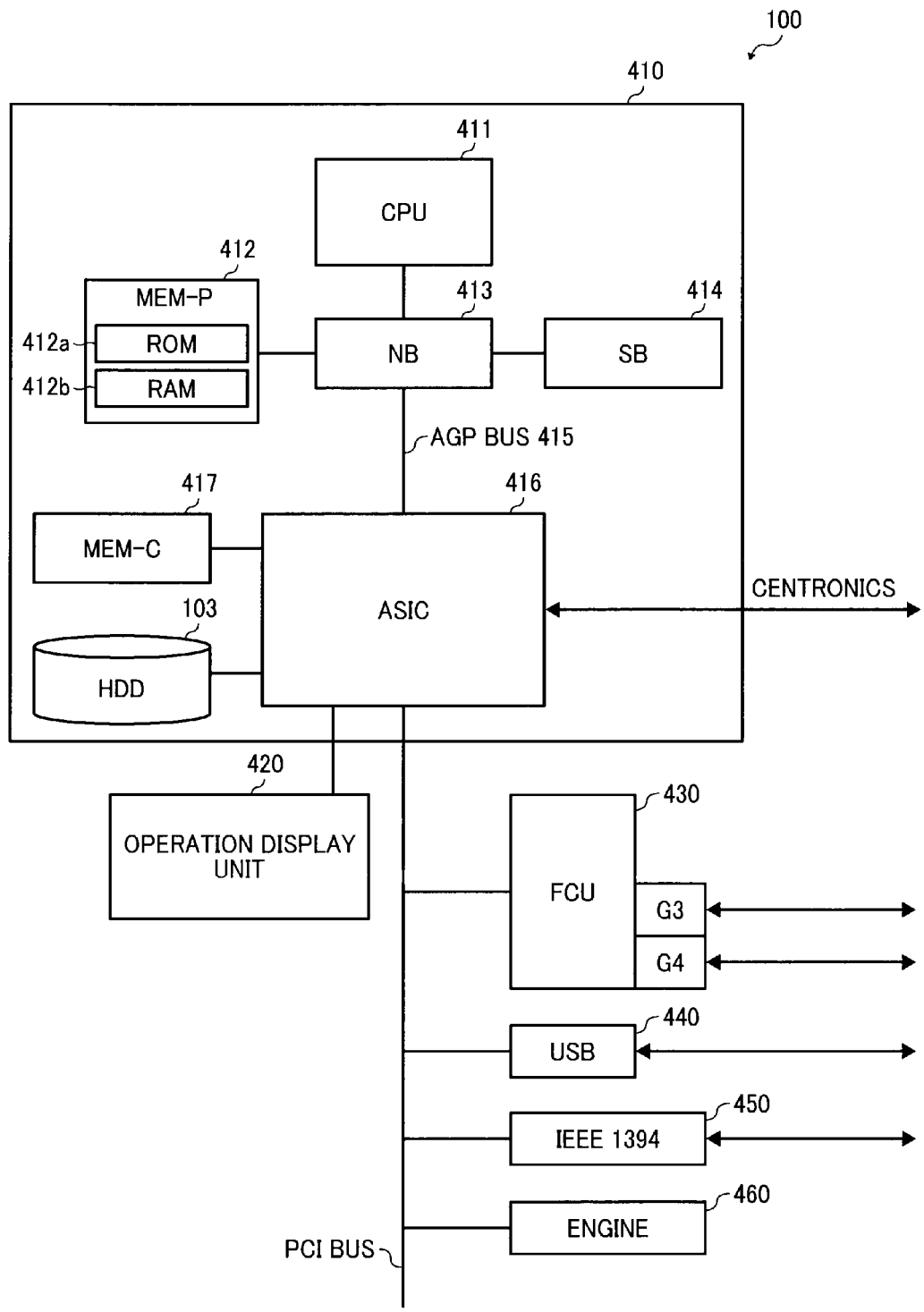
FIG. 15 is a block diagram illustrating an example of the hardware structure of the multi-function machine.

FIG. 15 is a block diagram illustrating an example of the hardware structure of the multi-function machine 100. As shown in FIG. 15, the multi-function machine 100 has a structure in which a controller 410 is connected to an engine unit (Engine) 460 by a peripheral component interface (PCI) bus. The controller 410 controls the overall operation of the multi-function machine 100, drawing, communication, and an input from an operating unit (not shown). The engine unit 460 is, for example, a printer engine that can be connected to the PCI bus. For example, the engine unit 460 is a black-and-white plotter, a one-drum color plotter, a four-drum color plotter, a scanner, or a facsimile unit. The engine unit 460 includes an image processing portion for, for example, error diffusion or gamma conversion, in addition to a so-called engine portion, such as a plotter.

The controller 410 includes a central processing unit (CPU) 411, a northbridge (NB) 413, a system memory (MEM-P) 412, a southbridge (SB) 414, a local memory (MEM-C) 417, an application specific integrated circuit (ASIC) 416, and the hard disk drive (HDD) 103. The northbridge 413 is connected to the ASIC 416 by an accelerated graphics port (AGP) bus 415.

The CPU 411 controls the overall operation of the multi-function machine 100, has a chipset including an NB 413, a MEM-P 412, and an SB 414, and is connected to other apparatuses through the chipset.

The NB 413 is a bridge for connecting the CPU 411 to the MEM-P 412, the SB 414, and the AGP 415, and includes a memory controller that controls the reading/writing of data from/to the MEM-P 412, a PCI master, and an AGP target.

The MEM-P 412 is a system memory used as, for example, a memory for storing programs or data, a memory for expanding programs or data, and a drawing memory of a printer and includes a read only memory (ROM) 412a and a random access memory (RAM) 412b. The ROM 412a is used as a memory for storing programs or data, and the RAM 412b is a writable and readable memory used as, for example, a memory for expanding programs or data and a drawing memory of a printer.

The SB 414 is a bridge for connecting the NB 413 to a PCI device and a peripheral device. The SB 414 is connected to the NB 413 through the PCI bus. For example, a network interface (I/F) unit is also connected to the PCI bus.

The ASIC 416 is an integrated circuit (IC) only for image processing that has hardware elements for image processing. The ASIC 416 functions as a bridge that connects the AGP 415, the PCI bus, the HDD 103, and the MEM-C 417. The ASIC 416 includes a PCI target, an AGP master, an arbiter (ARB) that functions as the core of the ASIC 416, a memory controller that controls the MEM-C 417, a plurality of direct memory access controllers (DMACs) that performs, for example, the rotation of image data using hardware logic, and a PCI unit that performs data communication with the engine unit 460 through the PCI bus. A facsimile control unit (FCU) 430, a universal serial bus (USB) 440, and the Institute of Electrical and Electronics Engineers 1394 (IEEE 1394) interface 450 are connected to the ASIC 416 through the PCI bus. An operation display unit 420 is directly connected to the ASIC 416.

The MEM-C 417 is a local memory that is used as an image buffer for copy and a code buffer. The HDD 103 is a storage that stores image data, programs, font data, and forms. In addition, the HDD 103 stores the server programs downloaded from the software distribution system 301.

The AGP 415 is a bus interface for a graphics accelerator card that is proposed in order to speed up a graphics process. The AGP 415 directly accesses the MEM-P 412 at high throughput to speed up the graphics accelerator card.

The installation program executed in the multi-function machine 100 is incorporated into the ROM in advance and is then provided.

The installation program executed in the multi-function machine 100 according to the second embodiment is a file with a format that can be installed or executed and it may be recorded on a computer-readable recording medium, such as a CD, a flexible disk (FD), or a DVD, and then provided.

The installation program executed in the multi-function machine 100 according to the second embodiment may be stored in a computer that is connected to a network, such as the Internet, and then downloaded through the network to be provided. In addition, the installation program executed in the multi-function machine 100 according to the second embodiment may be provided or distributed through a network such as the Internet.

The installation program executed in the multi-function machine 100 according to the second embodiment is configured by a module including at least the application installation control service 131. As actual hardware, for example, the CPU 411 reads the installation program from a ROM 411a and executes the installation program. Then, the application installation control service 131 is loaded to the main storage device and the application installation control service 131 is generated on the main storage device.

The management apparatus 302, the software distribution server 301, the license management server 300, and the web server 303 according to the second embodiment include a control device, such as a CPU, a storage device, such as a ROM or a RAM, an HDD, an external storage device, such as an optical disk drive, a display device, such as a display, and an input device, such as a keyboard or a mouse, and has a hardware structure using a general computer.

Modification of Second Embodiment

Next, a modification of the second embodiment will be described. In the second embodiment, the process between the software distribution server 301 and the license management server 300, and the multi-function machine 100 is performed through the relay apparatus 200. However, in this modification, the software distribution server 301 and the license management server 300 directly transmit/receive various kinds of data to/from the multi-function machine 100 without using the relay apparatus 200.

Figure 16:
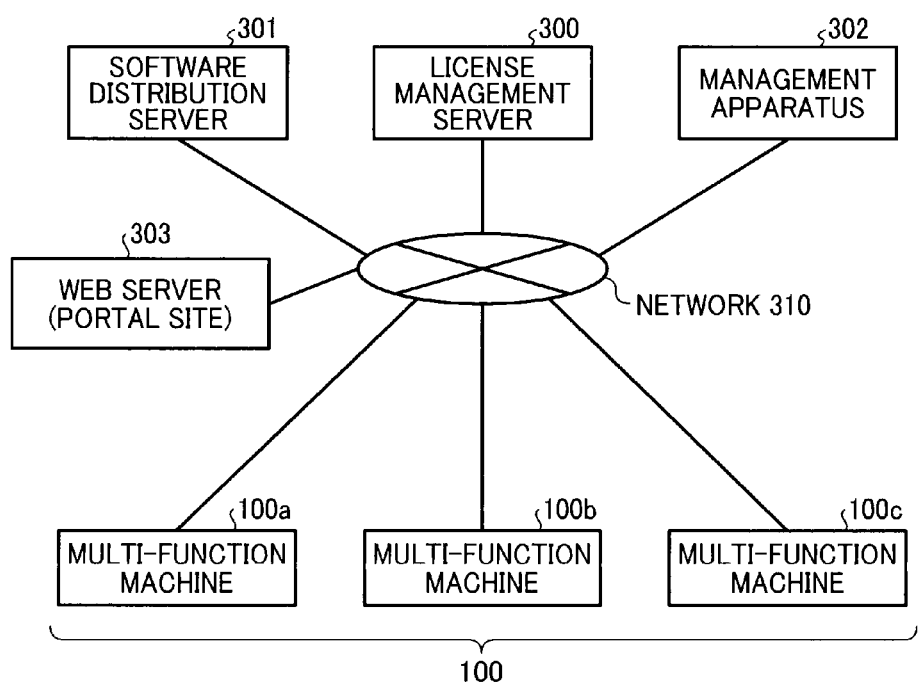
FIG. 16 is a diagram illustrating an example of the network structure of a software distribution system according to a modification of the second embodiment of the invention.

FIG. 16 is a diagram illustrating an example of the structure of a software distribution system according to this modification. In this modification, as shown in FIG. 16, the management apparatus 302, the software distribution server 301, the license management server 300, the web server 303, and the multi-function machine 100 (multi-function machines 100a, 100b, and 100c) are connected to the network 310, and the relay apparatus is not provided.

The management apparatus 302, the software distribution server 301, the license management server 300, and the web server 303 have the same structure as those according to the second embodiment. However, the management apparatus 302 directly receives apparatus information from the multi-function machine 100 and directly transmits an installation request to the multi-function machine 100.

According to the invention, it is possible to easily check the dependence between programs.

The invention has been made in view of the above-mentioned problems and an object of the invention is to provide a technique capable of easily checking the dependence between programs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A program management system comprising:
a client; and
a server that is connected to the client through a network,
wherein the server includes:
a program storage unit that stores a program to be installed in the client; and
a first program information storage unit that stores first program information including information indicating the program stored in the program storage unit and information indicating dependence between the program stored in the program storage unit and other programs stored in the program storage unit, and
the client includes:
a processor,
a memory storing a control program to be executed by the processor, the memory is further configured to be able to add one or more first programs to extend function of the client, and
a network interface configured to connect to a server apparatus which has one or more second programs, wherein
the control program includes instructions that cause the processor to:
send, to the server apparatus, a request for obtaining information regarding the one or more second programs,
receive, from the server apparatus, the information regarding the one or more second programs, the information including identification information to identify the one or more second programs and dependence information between the one or more second programs,
display, on a display device, a selection screen for receiving selection of a program to be added in the memory from among the one or more second programs,
determine whether a program having dependence with the program selected through the selection screen is already installed,
display, on the display device, an instruction screen for receiving an execution instruction of addition of the program selected through the selection screen in the memory while displaying a program having dependence with the program selected through the selection screen, and display, if a program having dependence with the program selected through the selection screen is already installed, that the program is already installed, and execute, upon receiving the execution instruction through the instruction screen, addition of the program selected through the selection screen in the memory while also adding, in the memory, a program that has dependence with the program selected through the selection screen and is not yet installed.

2. An apparatus comprising:

a processor;

a memory storing a control program to be executed by the processor, the memory is further configured to be able to add one or more first programs to extend function of the apparatus; and a network interface configured to connect to a server apparatus which has one or more second programs, wherein the control program includes instructions that cause the processor to:

send, to the server apparatus, a request for obtaining information regarding the one or more second programs, receive, from the server apparatus, the information regarding the one or more second programs, the information including identification information to identify the one or more second programs and dependence information between the one or more second programs, display, on a display device, a selection screen for receiving selection of a program to be added in the memory from among the one or more second programs, determine whether a program having dependence with the program selected through the selection screen is already installed, display, on the display device, an instruction screen for receiving an execution instruction of addition of the program selected through the selection screen in the memory while displaying a program having dependence with the program selected through the selection screen, and display, if a program having dependence with the program selected through the selection screen is already installed, that the program is already installed, and execute, upon receiving the execution instruction through the instruction screen, addition of the program selected through the selection screen in the memory while also adding, in the memory, a program that has dependence with the program selected through the selection screen and is not yet installed.

3. A method performed on an client apparatus, the method comprising steps of:

sending, via a network interface to a server apparatus, a request for obtaining information regarding one or more first programs stored on the server;

receiving, from the server apparatus, the information regarding the one or more first programs, the information including identification information to identify the one or more first programs and dependence information between the one or more first programs;

displaying, on a display device, a selection screen for receiving selection of a program to be added in a memory from among the one or more first programs, the memory configured to be able to add one or more second programs to extend function of the client apparatus;

determining, by a processor of the client apparatus, whether a program having dependence with the program selected through the selection screen is already installed;

displaying, on the display device, an instruction screen for receiving an execution instruction of addition of the program selected through the selection screen in the memory while displaying a program having dependence with the program selected through the selection screen, and displaying, if a program having dependence with the program selected through the selection screen is already installed, that the program is already installed; and executing, upon receiving the execution instruction through the instruction screen, addition of the program selected through the selection screen in the memory while also adding, in the memory, a program that has dependence with the program selected through the selection screen and is not yet installed.

* * * * *